United States Patent [19]

Goiseau

[11] 4,420,026
[45] Dec. 13, 1983

[54] MACHINE FOR AUTOMATICALLY FITTING TIRES TO RIMS

[75] Inventor: Pierre A. Goiseau, Verneuil sur Seine, France

[73] Assignee: Societe de Mecanique General - Goiseau Guittot, Les Mureaux, France

[21] Appl. No.: 311,956

[22] Filed: Oct. 16, 1981

[30] Foreign Application Priority Data

Oct. 27, 1980 [FR] France ............................. 80 22959

[51] Int. Cl.³ .............................................. B60C 25/08
[52] U.S. Cl. .................................................. 157/1.24
[58] Field of Search ...................... 157/1.1, 1.17, 1.24, 157/1.2; 198/631

[56] References Cited

U.S. PATENT DOCUMENTS

| | | | |
|---|---|---|---|
| 2,661,053 | 12/1953 | Mullen | 157/1.1 |
| 2,665,747 | 1/1954 | Harrison | 157/1.1 |
| 2,817,394 | 12/1957 | Kriebel, Jr. et al. | 157/1.24 |
| 2,900,015 | 8/1959 | Harrison | 157/1.1 |
| 2,900,018 | 8/1959 | Harrison | 157/1.24 |
| 3,545,463 | 12/1970 | Mueller | 157/1.24 |
| 3,978,903 | 9/1976 | Mueller et al. | 157/1.2 |

*Primary Examiner*—James G. Smith
*Attorney, Agent, or Firm*—Cesari and McKenna

[57] ABSTRACT

The invention provides a machine for automatically fitting tires to rims, comprising a continuously driven endless conveyor (1), a first feed device (3) provided at the entrance of the conveyor for placing rims (A) one after the other flat on the carrier side (4) thereof, a second feed device (5) situated downstream of the first one for placing a tire (B) of corresponding size aslant on each rim, a tire-fitting head (6) situated downstream of the second feed device for fitting the tire to the rims, and means (7) for discharging the tired rims.

This machine is characterized in that it comprises adjustment means (16) disposed upstream of the tire-fitting head (6), for automatically and continuously bringing the upper face of rims (A) to a constant predetermined height with respect to the carrier side (4) of the conveyor (1).

19 Claims, 7 Drawing Figures

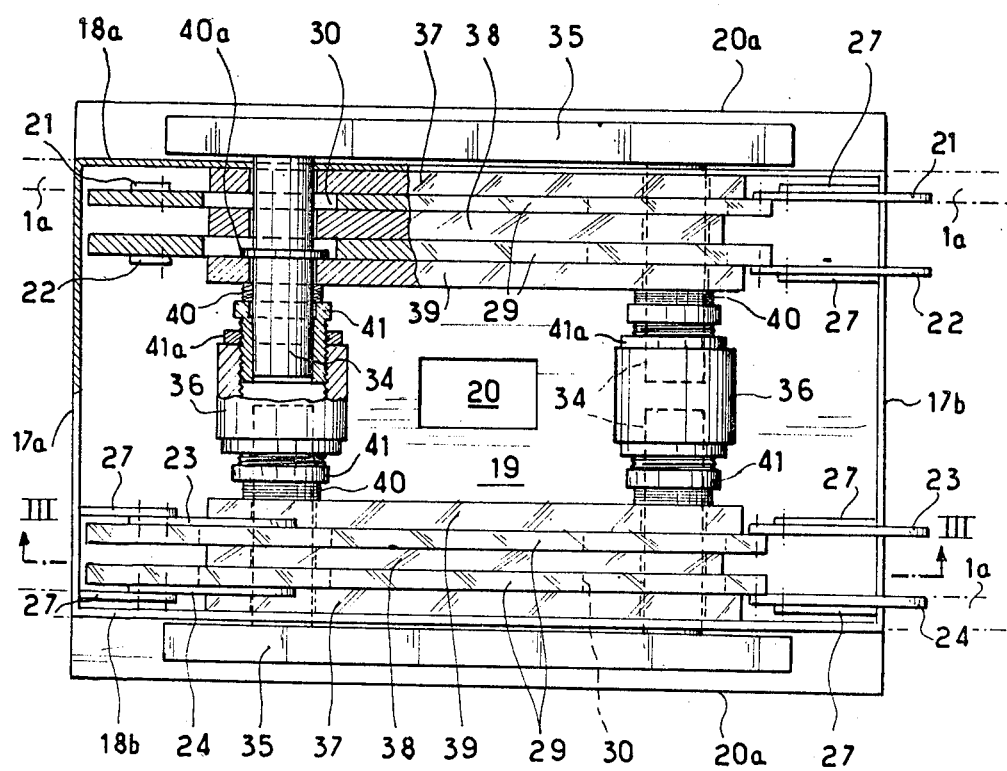
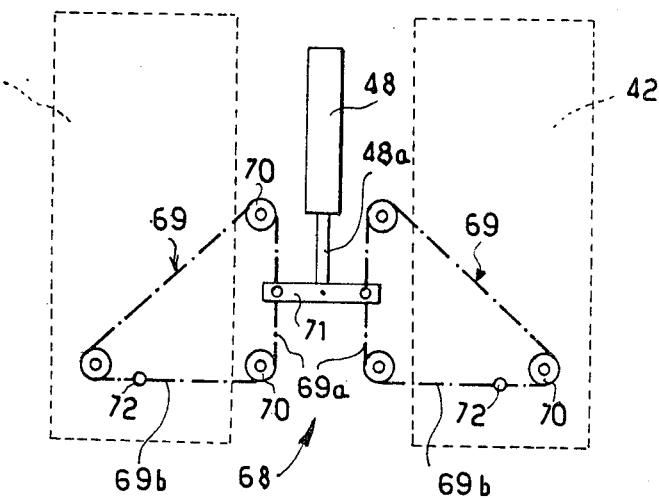

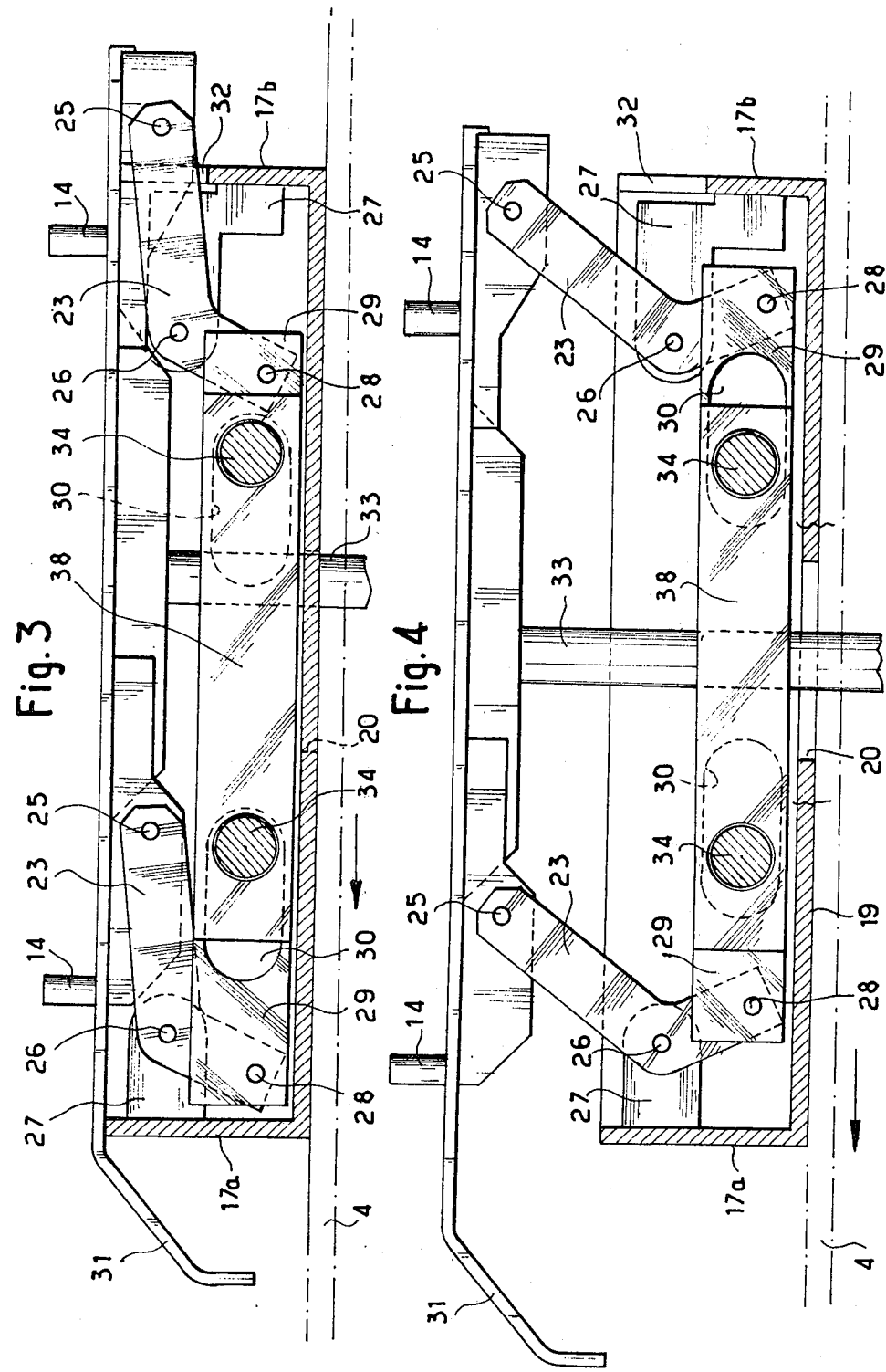

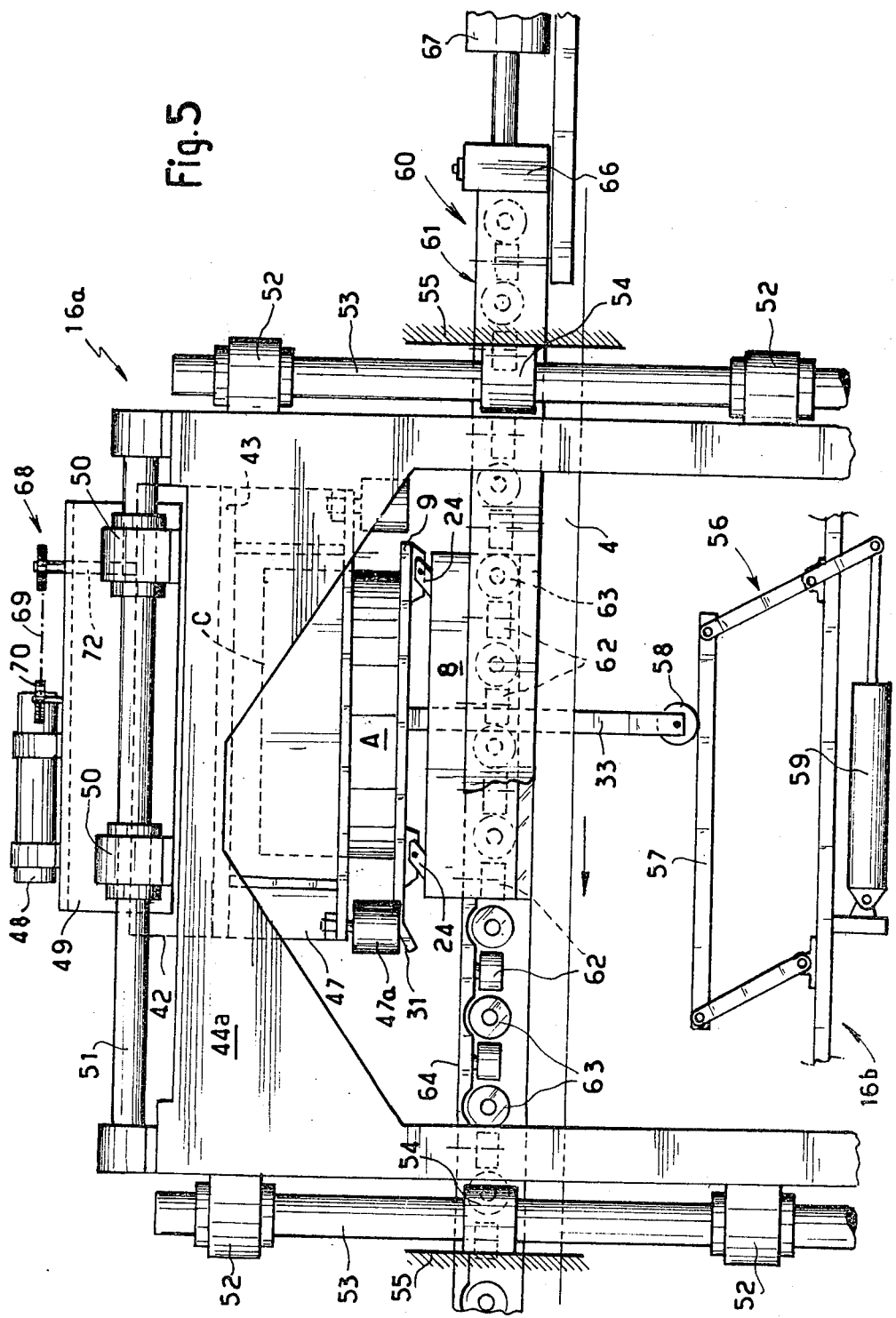

MACHINE FOR AUTOMATICALLY FITTING TIRES TO RIMS

The present invention relates to a machine for automatically fitting tyres on to rims, which machine comprises a continuously driven endless conveyor, a first feed device provided at the entrance of the conveyor for placing rims flat one after the other on the carrier side thereof, a second feed device situated downstream of the first one for placing aslant each rim a tyre of corresponding size, a tyre-fitting head situated downstream of the second feed device for fitting tyres on the rims, and discharge means for discharging the tyred rims.

Machines of this type at present used by tyre manufacturers and in motor vehicle assembly lines are for fitting tyres to rims at a high rate.

In such machines, the tyre-fitting head is equipped with rollers of different configurations which cooperate to cause each tyre to penetrate into the well of the corresponding rim when this latter advances under the tyre-fitting head. Each roller has a well defined function which it can only perfectly fulfil if it is positioned at a very precise height with respect to the upper face of the rim.

These requirements mean that these known machines do not allow rims of different thicknesses to be continuously fitted with tyres, unless their operation is stopped between two successive tyre-fitting operations to adjust the height of the rollers. Now, this operation obviously results in a slowing down of the rate in obtaining rims fitted with tyres.

The present invention proposes remedying this disadvantage and, for this, it provides a machine of the above-mentioned type which is characterized in that it comprises adjustment means for bringing automatically and continuously the upper face of the rims to a constant predetermined height with respect to the carrier side of the conveyor, before they pass under the tyre-fitting head.

With these arrangements, the upper face of the rims is always, whatever the thickness of the rims, at the same height opposite the rollers of the tyre-fitting head, this height being of course judiciously chosen with respect to the position of these latter. It will be easily inferred therefrom that in this manner rims may be continuously fitted with tyres without having to worry about their thickness, which does away with the need to stop the operation of the machine between two successive tyre-fitting operations in order to adjust the height of the tyre-fitting rollers.

In a preferred embodiment of the invention, the endless conveyor comprises two chains driven in synchronism and supports secured one after the other to the two chains, these supports each comprising a horizontal table movable in height and provided with holding means for holding a rim in place on its upper face, whereas the adjustment means comprise:

a height limiter projecting over the carrier side of the conveyor, and situated between the two feed devices, this limiter being adjustable in height so as to be placed in a predetermined position in which it defines with this conveyor side a space whose height is equal to the predetermined height;

lifting means for lifting each table engaged under the height limiter, from a low position to a high position in which the upper face of the rim which it carries is in contact with the height limiter; and locking means for securing against movement and maintaining each table in its high position, means being provided for bringing each table back to its low position at the exit of the tyre-fitting head.

Thus, each rim carried by a table is moved in height by the lifting means until it arrives in contact with the height limiter. It is then in a position in which its upper face is at the desired height with respect to the tyre-fitting rollers. It is then secured against movement and held in this position by the locking means until a tyre has been fitted thereto. Thus, in a simple way constant height positioning is obtained of the upper face of the rims which follow each other on the conveyor, even if these latter have a non uniform thickness.

Preferably, each table is connected to the corresponding support by means of at least one pair of identical levers hinged by one of their ends to the table and pivotably mounted on the support about an axis perpendicular to the longitudinal axis of the conveyor.

Thus, the tables remain interlocked with their support when they are moved in height.

More precisely, the levers of each pair are coplanar, whereas their pivoting axes are situated respectively in the vicinity of the front and rear ends of the support.

Advantageously, the pairs of levers are four in number and are spread out in twos in the vicinity respectively of the lateral edges of the support. With these arrangements, the tables are completely stabilized in the horizontal position during their movement in height.

Furthermore, the levers of each pair are connected at their other ends by at least one connecting link parallel to the table, this connecting link forming an element on which the locking means act in order to secure the table against movement.

In a preferred embodiment, the height limiter comprises two stops situated on each side of the conveyor and mounted on a gantry movable in height.

These stops, which form the elements of the height limiter with which the upper face of the rims comes into contact may also be adjusted in height.

The machine of the invention further comprises means for slightly raising the height limiter just before a rim advances thereunder in order to bring it into its predetermined position as soon as this rim is completely enged under the limiter. Thus, the rims whose upper face is already positioned at the predetermined height may penetrate into the height limiter without rubbing against the stops.

Advantageously, the machine of the invention also comprises means for slightly raising the height limiter when the upper face of the rim is in contact therewith and when the table which carries it is locked. This arrangement is provided so as to allow the rims to easily leave the height limiter.

It is obvious that, as a variation, single means may be provided which would successively fulfil the functions of the two last mentioned means.

According to another feature of the height limiter, the stops are slidably mounted at the upper part of the gantry along at least one cross piece perpendicular to the longitudinal axis of the conveyor and each carries on the side thereof the most removed from the conveyor a vertical spacer intended to come into contact with a rim coming into engagement under the height limiter, whereas actuating means are provided for accompanying the shifting away from each other of the spacers as soon as a rim is engaged thereunder, so as to secure them against movement as soon as they are in contact with two diametrically opposite points on the rim and so as to bring them back together once the rim has passed beyond their front end.

It will be readily understood that, when a rim is engaged under the limiter, the stops are moved away from each other against the action of the actuating means or with the help thereof, until they are positioned just above two diametrically opposite points on the circumference of the rim, i.e. at places such that this latter will unquestionably come into contact therewith. Thus stops may be provided which project very little and which guarantee an almost pin-point contact with the rims.

More precisely, the means for actuating the spacers comprise a jack fixed with respect to the cross pieces supporting the stops and whose piston rod is parallel to the longitudinal axis of the conveyor, as well as two endless chains each passing round three gear wheels integral with the cross pieces so as to form two symmetric triangles with respect to the longitudinal axis of the conveyor, each chain having a section parallel to the piston rod of the jack and connected thereto, and a section perpendicular to the longitudinal axis of the conveyor and connected to a respective stop. Thus, when the piston rod of the jack is moved in one direction or in the other, the stops are moved apart or brought together, the jack being of course pressurized so as to act on the stops in accordance with the previously mentioned cycle.

Advantageously, the spacers comprise rollers on their opposing faces and in the vicinity of their base. This arrangement reduces to a maximum the rubbing of the rims on the spacers when they advance therebetween.

According to another feature of the height limiter, the stops are movable parallel to the longitudinal axis of the conveyor, means being provided for, on the one hand, accompanying the movement of the stops when a rim in contact therewith carries them along in the direction of travel of the conveyor and, on the other hand, for moving the stops in the opposite direction as soon as the rim is freed from contact therewith.

In a preferred embodiment of the invention, the tables each comprise a foot extending inwardly of the conveyor and the lifting means comprise a lifting rail parallel to the carrier side of the conveyor and forming a guide path for the lower end of the foot of the tables when these latter advance under the height limiter, as well as means for actuating the rail for lifting this latter when a support is completely engaged under the limiter, securing it against movement when the rim it carries is in contact with this latter and lowering it once the rim is completely freed from contact therewith.

It will be readily understood that during raising of the rail, the feet are moved upwards while imparting this movement to the corresponding table; the rail is secured against movement as soon as the rim is placed at the desired height so as to leave time for the lowering means to act on the table which carries it, then is lowered for the next operating cycle.

Advantageously, the locking means comprise pressure plates parallel to the connecting links and encompassing these latter two by two, one of the lateral pressure plates being fixed whereas the other pressure plates are mobile in a direction transverse to the links; at least one shaft slidably passing through the pressure plates and passing into an oblong opening formed in each connecting link; a decompression rail external to the support and on which is fixed the end of the nearest shaft to the fixed pressure plate; and at least one spring washer fitted on to the shaft between a fixed bearing slidably receiving the other end of the shaft and the face of the mobile lateral pressure plate which is facing the bearing, the shafts further comprising a collar which is applied against the other face of the mobile lateral pressure plate, inside the oblong opening of the adjacent connecting link. It will be readily understood that, when the decompression rail is at rest, the spring washer exerts a force on the mobile lateral pressure plate which cooperates with the other plates so as to exert a pressure on both sides of the connecting links and to prevent the levers and the table from moving.

Additionally, means are provided for moving the decompression rail towards the support as soon as a rim is at the level of the entrance of the height limiter and until this latter has come into contact therewith.

When these means move the decompression rail towards the support, the associated shaft pushes, through its collar, the mobile lateral pressure plate against the compression force of the spring washer, which causes the connecting links to be unlocked. Then, these latter may move longitudinally along their oblong openings so as to allow the levers to follow the upwards movement of the table unitl the upper face of the rim it carries comes into contact with the stops of the limiter.

One embodiment of the present invention will be described hereafter by way of non limiting example with reference to the accompanying drawings in which:

FIG. 2 is an enlarged top view, partially in section, of a rim support in accordance with the invention, the table of which has been removed;

FIG. 3 is an enlarged sectional view, along line III—III of FIG. 2, in which the bearings supporting the shafts have not been shown;

FIG. 4 is a view identical to FIG. 3 in which the supporting table is shown in the high position;

FIG. 5 is a schematic lateral view with parts cut away of the machine in accordance with the invention, taken at the level of the height limiter;

FIG. 7 is a schematic top view of the height limiter.

Figure 1:
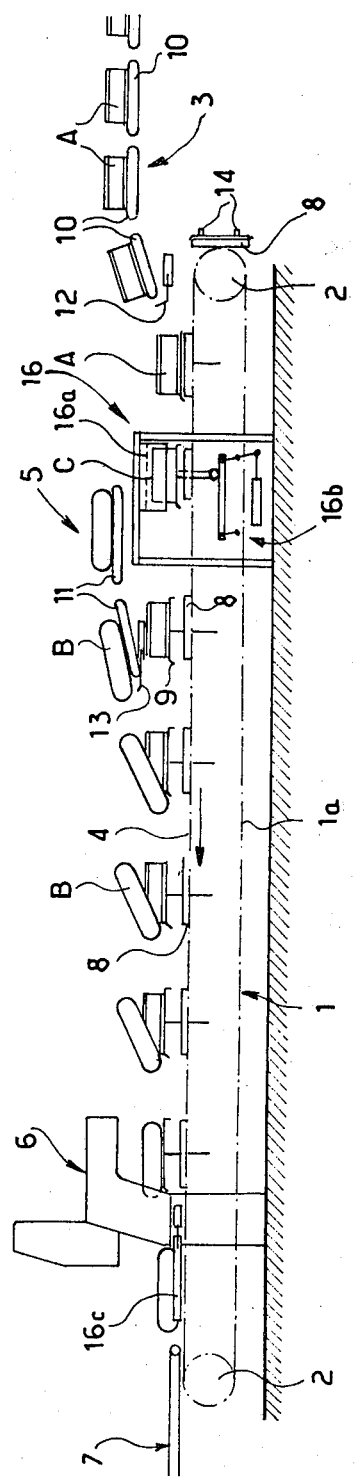
FIG. 1 is a schematic lateral view of the machine of the invention.

As can be seen in FIG. 1, the machine of the invention comprises an endless conveyor 1 continuously driven about two pinions 2. A first feed device 3 is provided at the entrance of the conveyor for placing rims A flat one after the other on the carrier side 4 thereof. The machine of the invention further comprises a second feed device 5 situated downstream of the first one for placing a tyre B of corresponding size aslant on each rim A, a tyre-fitting head 6 situated downstream of the second feed device 5 for fitting the tyres to the corresponding rims and a means 7 for discharging the tyred rims.

More precisely, the conveyor 1 is formed from two parallel chains 1a driven in synchronism. On these chains are fixed supports 8, one after the other, which each comprise a table 9 movable in height between a low position and a variable high position, each table 9 being intended to receive a rim A. The function of these tables will be described further on.

Feed devices 3 and 5 are each formed, in a way known per se, from a succession of transporting belts 10 and 11 each carrying respectively rims A and tyres B. Two mechanical stops 12, 13 control the step by step placing respectively of rims A flat on tables 9 and tyres B aslant on rims A. Stop 12 is controlled so as to allow a rim A to be placed and simultaneously to initiate the operation of belts 10 solely when table 9 is in a low position thereunder and when tyres are present on belts 11. Rims A are then held in place on the tables 9 by means of holding members 14. Stop 13 is, as far as it is concerned, controlled so as to allow tyres B to be placed and to initiate at the same time the operation of belts 11 solely when a table arrives thereunder carrying a rim A.

Furthermore, the tyre-fitting head 6 is conventionally equipped with an assembly of tyre fitting rollers, mounted at a very precise height so as to exert an action for fitting the tyres to the rims which are at the level thereof.

It should be further added that the discharge means 7 are formed, in a way known per se, by a transporter belt comprising a horizontal central band and two inclined lateral bands on which the running tracks of the mounted wheels may bear.

According to an important feature of the machine of the invention, adjustment means 16 are provided for bringing the upper face of rims A automatically to a constant predetermined height with respect to the carrier side 4 of conveyor 1. These adjustment means comprise essentially a height limiter 16a situated between the two feed devices 3 and 5, lifting means 16b situated below this latter and intended to raise each table 9 engaged under limiter 16a so as to bring the rim it carries into contact therewith, and locking means (not shown in FIG. 1) which secure each table against movement as soon as the upper face C of the rim A which it carries is in contact with the limiter.

The machine of the invention further comprises means 16c which bring the tables back again to a low position on leaving the tyre-fitting head 6.

FIGS. 2 to 4 show a support 8.

As can be seen more clearly in FIG. 2, this support comprises two transverse walls 17a and 17b perpendicular to the chains 1a, two longitudinal walls 18a and 18b parallel to these latter as well as a bottom 19 having an opening therethrough 20. The bottom 19 is extended, along longitudinal walls 18a and 18b, by horizontal flanges 20a.

Table 9 is connected to support 8 by means of four pairs of identical cranked levers 21, 22, 23 and 24. The two levers of each pair are in the same plane parallel to the longitudinal walls 18a and 18b of the support 8, the pairs of levers being furthermore spread out in twos in the vicinity of the longitudinal walls of support 8.

Referring to FIGS. 3 and 4, it can be seen that one of the ends of each lever 21 to 24 is hinged, by means of a pivot 25, to the lower face of table 9. The two levers of the same pair are further pivotably mounted on brackets, 27 integral respectively with transverse walls 17a and 17b of support 8, about shafts 26 perpendicular to the chains of conveyor 1. Furthermore, the upper ends of the levers of the same pair are connected by hinged connections 28 to a common connecting link 29 parallel to table 9 and having two oblong openings 30 therethrough.

In FIGS. 3 and 4, it can be further seen that the table has a downwardly sloping flange 31 on its front transverse side, this sloping flange facilitating the placing of the tyres aslant on the corresponding rims. Vertical slits 32 are further provided on the rear transverse wall 17b of the support for receiving levers 21 to 24 when the table 9 is in a low position (see FIG. 3). A foot 33 is moreover fixed to the table 9 and extends inwardly of conveyor 1 by passing through the opening 20 in bottom 19 of support 8.

It will be understood that by exerting an upward thrust on the foot 33 table 9 may be easily raised from a low position (see FIG. 3) to any high position (see FIG. 4). Levers 21 to 24 follow this movement while maintaining the table parallel to the carrier side of conveyor 1.

As can be clearly seen in FIG. 2, each longitudinal half of support 8 comprises two parallel shafts 34 which slidably pass through the corresponding longitudinal wall 18a or 18b of the support. The ends of these shafts, externally of support 8, are connected by a decompression rail 35 parallel to and slightly spaced apart from the longitudinal wall, whereas their other ends are each slidably mounted inside a bearing 36 integral with the bottom 19 of support 8. The two shafts 34 are fitted into the oblong openings 30 of the two connecting links 29 situated in the corresponding half of support 8. Both shafts 34 pass furthermore slidingly through three pressure plates 37, 38 and 39 which encompass in twos the connecting links 29. Lateral pressure plate 37, the nearest to the corresponding longitudinal wall, is welded to this latter, whereas the other two pressure plates 38 and 39 are mobile along shafts 34. Several spring washers 49 are fitted on to each shaft 34, between bearing 36 and the face of the mobile pressure plate 37 which is opposite this latter. It will be further observed that each shaft 34 comprises a collar 40a (only one of which is shown in FIG. 2), this collar being applied against the other face of pressure plate 39, inside the oblong opening 30 of the adjacent connecting link 29.

It will be understood that the combination of the elements which have just been described form the above-mentioned locking means, which are intended to secure table 9 against movement with respect to its support 8.

In fact, when decompression rails 35 are not urged inwardly of the support, as shown in FIG. 2, the spring washers 40, inside each support half, expand and exert a pressure against plate 39. This latter then presses the connecting link which is adjacent thereto against plate 38 which consequently compresses the other connecting link against fixed plate 37. Thus, the links 29 are secured against movement and accordingly table 9 is completely locked.

On the other hand, if each decompression rail 35 is moved towards the support, the associated shafts 34 push, through their collar 40, each pressure plate 39 against the compression force of spring washers 40, which frees from mutual contact therewith the other plates 37 and 38 and links 29. These latter may then be moved along their oblong openings, not only in height but also in a direction parallel to the longitudinal walls of the support, so as to allow table 9 to move.

Turning back to FIG. 2, it can be seen that each bearing 36 receives in a threaded bore a socket 41 in which the corresponding shaft 34 slides and whose head serves as a stop for the spring washers 40. As will be readily understood, this assembly forms a means for adjusting the amount of compression of spring washers 40. It will be further observed that each socket 41 is fitted with a lock-nut 41a which secures it against movement after adjustment.

Figure 6:
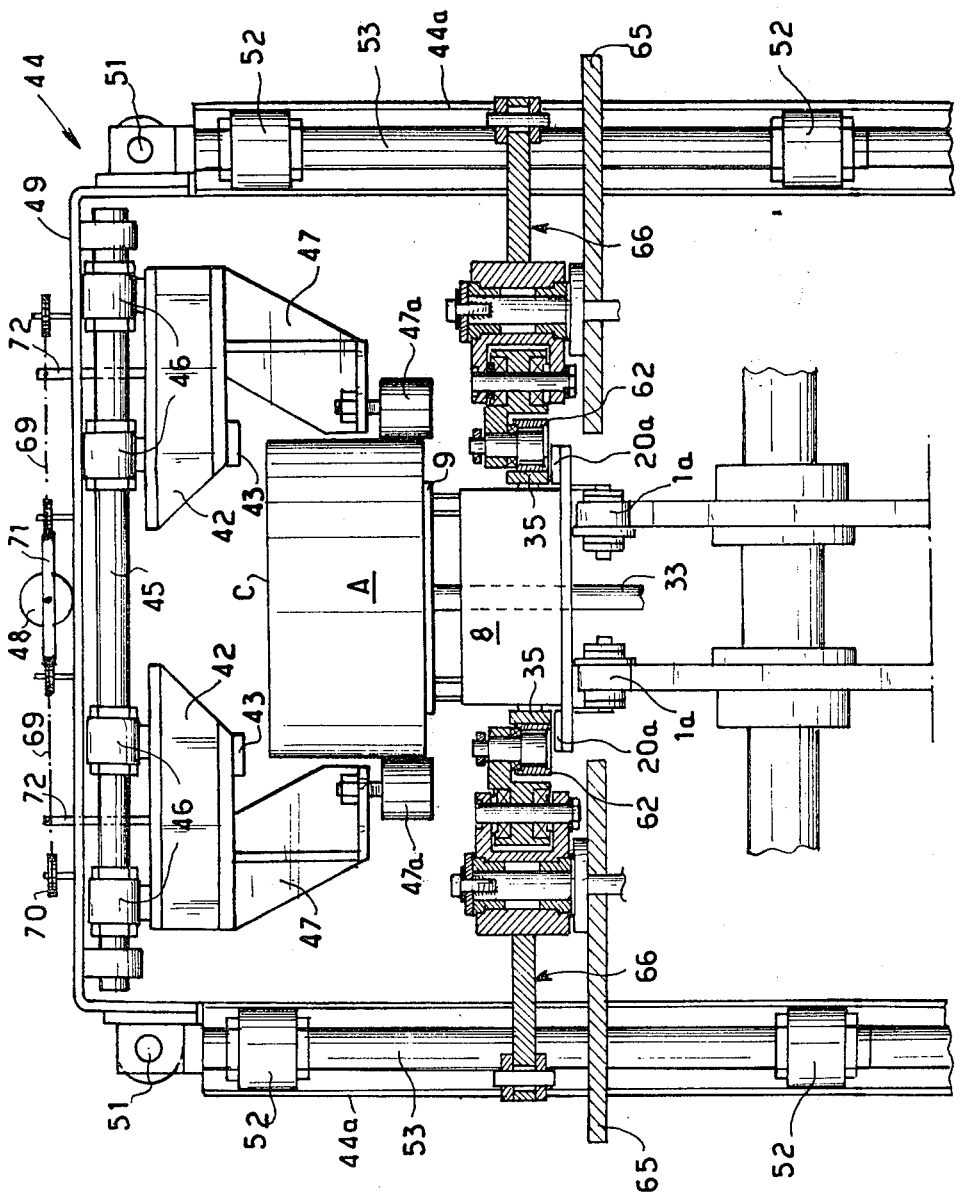
FIG. 6 is a front view, partially in section, of the machine, taken opposite the height limiter.

Height limiter 16a, which is shown in FIGS. 5 and 6, comprises two stops 42 extending over a certain length on each side of conveyor 1. Stops 42 each comprise a heel 43 on the side thereof the closest to conveyor 1, the two heels defining with the carrier side 4 of conveyor 1 a passage having a height equal to the predetermined height to which it is desired that the upper face C of rims A be brought. These heels 43 form elements in contact with which rims A are brought by the action of lifting means 16b on to tables 9.

Stops 42 are mounted on a gantry 44 comprising in its upper part several horizontal cross pieces 45 (only of which is visible in FIG. 6). On these cross pieces, which are perpendicular to the longitudinal axis of conveyor 1, stops 42 are slidably mounted by means of ball sockets 46.

Furthermore, each one of steps 42 carries on its side the furthest removed from conveyor 1 a vertical spacer 47. The two spacers 47 are intended to come into contact with a rim coming into engagement under limiter 16a. For this reason, they are provided on their facing faces and in the vicinity of their bases, with four rollers 47a disposed in twos at the level respectively of the front and rear ends of the spacers.

Actuating means 68 are provided for accompanying the moving apart from each other of spacers 47 as soon as a rim A is engaged therebetween, so as to secure them against movement when the front rollers are in contact with two diametrically opposite points of the rim and so as to bring them towards each other again when the rim has left limiter 16a. With these arrangements, stops 42 position themselves, depending on the diameter of the rim, in a position in which this latter will unquestionably come into contact therewith. This mobile system allows heels 43 of small width to be used, which ensures a practically pin-point contact with the rim.

Referring simultaneously to FIGS. 5, 6 and 7, it can be seen that means 68 comprise a pneumatic jack 48 fixed to the middle part of a table 49 which carries the cross pieces 45. The jack is mounted so that its piston rod 48a is parallel to the longitudinal axis of conveyor 1. Jack 48 is associated with two endless chains 69 each passing round three gear wheels 70 also mounted on table 49, so as to form two triangles symmetrical with respect to the longitudinal axis of conveyor 1. Each chain 69 has a section 69a parallel to the longitudinal axis of the conveyor and a section 69b perpendicular to this latter. The two sections 69a are connected by means of a strap 71 to the piston rod 48a of jack 48, whereas each of the sections 69b is interlocked with a respective stop 42 by means of a stud 72 which may move along a slit (not shown) provided in table 49, perpendicularly to the longitudinal axis of conveyor 1.

It will be readily understood that when the piston rod 48a of jack 48 is moved in the direction of travel of conveyor 1, spacers 47 are brought close to one another. On the other hand, when piston rod 48a is moved in the opposite direction, it tends to move spacers 47 apart from each other. Detectors (not shown) are provided so as to pressurize the jack so that it acts on the spacers in accordance with the above-described cycle.

As will be seen further on, the lifting means 60b cease lifting tables 9 as soon as the rim which they carry has come into contact with heels 43, then secures them against movement by compressing the rim against the heels for the period of time required for locking the tables.

It goes without saying that, without other arrangements, the rims would be considerably damaged or the operation of the machine would be disturbed during this period of time, because of the fact that the rims are compressed during their advance against heels 43. This is why, as can be seen in FIGS. 5 and 6, table 49 is slidably mounted, by means of ball sockets 50, on two cylindrical rails 51 parallel to the longitudinal axis of conveyor 1. Thus, stops 42 are moved, by the rims in contact therewith, in the travelling direction of conveyor 1, and the above-mentioned disadvantages are eliminated.

Additionally, jacks (not shown) are provided for accompanying the movement of table 49 in the travelling direction of the conveyor and for bringing it back in the opposite direction to the entrance of limiter 16a, when the rim which it carries has been freed from contact with stops 42.

Furthermore, each rail 51 is carried by a framework 44a forming an integral part of gantry 44. Each frame 44a is slidably mounted, by means of bearings 52, on to columns 53 fixed by means of bearings 54 to the bed 55 of the machine. Jacks (not shown) are provided for moving frames 44a and so gantry 44 as a whole along columns 53.

These jacks are controlled so as to slightly raise gantry 44, and consequently stops 42, when a rim is in contact with heels 43 and when the table which carries it is locked in the high position, and to bring it back to the position in which the heels are remote from the carrier side 4 by the predetermined height, as soon as the next rim is completely engaged under stops 42.

These latter arrangements allow a rim whose upper face is already at the predetermined height before it advances under stops 42 to penetrate under these latter without rubbing against heels 43. They further ensure that the rims placed at the right height may move away from stops 42 at the exit of limiter 16a.

The means 16b mentioned above for lifting the tables are visible in FIG. 5. They comprise a deformable parallelogram 56, one large side of which forms a lifting rail 57 parallel to the carrier side 4 of conveyor 1 and serving as a guide path for the foot 33 of table 9. To this end, the free end of foot 33 carries a travelling roller 58.

The lifting means further comprise a double-acting jack 59 for deforming the parallelogram 56. This jack 59, whose piston rod is connected to the small side of the parallelogram 56, is controlled so as to instantaneously raise rail 57 as soon as support 8 is completely engaged under limiter 16a to secure it against movement when the corresponding rim is in contact with heels 43 and to lower it once the rim has been freed from contact with these latter.

FIGS. 5 and 6 also show means 60 provided for rendering inoperative the above-mentioned means for locking tables 9.

These means 60 comprise two mobile longitudinal elements 61 extending on each side of conveyor 1, between two points situated respectively slightly upstream of the entrance of limiter 16a and slightly downstream of the exit thereof. Each mobile element 61 comprises a series of horizontal 62 and vertical 63 rollers mounted alternately one after the other. Each mobile element 61 is connected to a fixed support 65 by means of a pantograph 66 whose operation is controlled by a jack 67. The pantographs 66 are actuated so as to move the mobile elements 61 perpendicularly to the travelling direction of the conveyor 1, to press them simultaneously against the decompression rails 35 so that these latter are moved towards support 8 as soon as a rim A is completely engaged under limiter 16a, to hold them in this position until this rim is in contact with heels 43 thereof and then to move them away therefrom.

When the mobile elements 61 act on the decompression rails 35, the horizontal rollers 62 come into contact with these latter so as to move them and the vertical rollers 63 roll on the flanges 20a of support 8 when this latter advances.

It may be further added that the means 16c provided for bringing the tables 9 back to a low position at the exit of the tyre-fitting head 6 are identical to means 60 which have just been described, except that they act on the decompression rails 35 of support 8 as soon as these latter have left the tyre-fitting head and relax their action as soon as table 9 is in a low position.

The operation of the machine which has just been described is the following:

Let us assume that first of all a rim A carried by a support 8 has just been released from stops 42 and that the rim resting on the next support is just in front of the entrance of limiter 16a. Table 49 is then in abutment at the entrance of limiter 16a, gantry 44 is slightly above the position in which heels 43 are maintained at the predetermined height above the carrier side 4 of conveyor 1, the lifting rail 57 is in a low position and mobile elements 61 are placed in a position in which they render inoperative the mechanism for locking the tables.

Progressively as rim A penetrates under stops 42, the spacers 47 are moved apart from each other until they are immobilized at two diametrically opposite points on the circumference of the rim. As soon as rim A is completely engaged under stops 42, gantry 44 is brought into its height adjustment position before the lifting rail 57 is propelled upwards to bring rim A into contact with heels 43. As soon as this contact is made, jacks 67 begin to move the mobile elements 61 away from each other so as to allow table 9 to be locked. During the locking period, rail 57 comes to a standstill while compressing rim A against heels 43. During its advance, the rim thus carries stops 42 along towards the exit of limiter 16a. Once table 9 is locked, the positioning of the upper face C of rim A at the constant predetermined height is achieved.

In the following step, rail 57 is brought to a low position, gantry 44 is slightly raised so as to allow the rim to free itself from stops 42 and these latter are brought back to the entrance of limiter 16a. Support 8 may then continue its advance on the conveyor with its table 9 held in its high position. When it passes under the feed device 5, the rim which it carries receives a tyre B of corresponding size. Support 8 then penetrates into the tyre-fitting head 6 where the tyre B is fitted on to rim A. At the exit from the tyre-fitting head 6, the table is brought back to a low position by means 16c. Tyred rim A is then brought by the discharge means 7 to an inflating station. Table 9 then continues to move while being maintained in its low position by the locking means.

It will be further added that, in a way known per se, the tyres are positioned on the feed device 5 in an order such that their size corresponds to that of the rims to which they are intended to be fitted.

It goes without saying that the height of heels 43 with respect to the carrier side of the conveyor may be adjusted so as to make it compatible with that of the rollers of the tyre-fitting head.

I claim:

1. A machine for automatically fitting tyres on rims, comprising a continuously driven endless conveyor (1), a first feed device (3) provided at the entrance of the conveyor for placing rims (A) one after the other flat on the carrier side (4) thereof, a second feed device (5) situated downstream of the first one for placing a tyre (B) of corresponding size aslant on each rim, a tyre-fitting head (6) situated downstream of the second feed device for fitting the tyres on the rims, and means (7) for discharging the tyred rims, said machine further comprising adjustment means (16) for automatically and continuously bringing the upper face of the rims (A) to a constant predetermined height with respect to the carrier side (4) of the conveyor (1), before they pass under the tyre-fitting head.

2. The machine as claimed in claim 1, characterized in that the endless conveyor (1) comprises two chains (1a) driven in synchronism and supports (8) fixed one after the other on the two chains, these supports each comprising a horizontal table (9) movable in height and provided with holding means (14) for holding a rim in place on its upper face, and in that the adjustment means (16) comprise:
   a height limiter (16a) projecting over the carrier side (4) of the conveyor (1), and situated between the two feed devices (3) and (5), this limiter being adjustable in height so as to be placed in a predetermined position in which it defines with this carrier side a space whose height is equal to the predetermined height;
   means (16b) for raising each table (9) engaged under the height limiter (16a) from a low position to a high position in which the upper face (C) of the rim which it carries is in contact with the height limiter; and
   locking means for securing and maintaining each table (9) in its high position, means (16c) being provided for bringing each table back to its low position on its exit from the tyre-fitting head (6).

3. The machine as claimed in claim 2, characterized in that each table (9) is connected to the corresponding support (8) by means of at least one pair of identical levers (21–24) hinged by one of their ends to the table and pivotably mounted on the support (8) about a shaft (26) perpendicular to the longitudinal axis of the conveyor (1).

4. The machine as claimed in claim 3, characterized in that the levers (21–24) of each pair are coplanar, while their pivoting shafts (26) are situated respectively in the vicinity of the front (17a) and rear (17b) ends of the support (8).

5. The machine as claimed in claim 4, characterized in that the pairs of levers are four in number and are distributed in twos in the vicinity respectively of the lateral edges (18a; 18b) of the support (8).

6. The machine as claimed in claim 4 or 5, characterized in that the levers (21–24) of each pair are connected at their other end by means of at least one connecting link (29) parallel to the table (9).

7. The machine as claimed in claim 2, characterized in that the height limiter (16a) comprises two stops (42) situated on each side of the conveyor (1) and mounted on a gantry (44) movable in height.

8. The machine as claimed in claim 2, characterized in that it further comprises means for slightly raising the height limiter (16a) just before a rim (A) penetrates thereunder and for bringing it back into its predetermined position as soon as said rim (A) is completely engaged under the limiter (16a).

9. The machine as claimed in claim 2, characterized in that it further comprises means for slightly raising the height limiter (16a) when the upper face of a rim is in contact therewith and when the table which it carries is locked.

10. The machine as claimed in claim 7, characterized in that the stops (42) are slidably mounted at the upper part of the gantry (44) along at least one cross piece (45) perpendicular to the longitudinal axis of the conveyor (1), and each carrying, on their side the most remote from the conveyor, a vertical spacer (47) intended to come into contact with a rim coming into engagement under the limiter (16a), and in that actuating means are provided for accompanying the moving apart from each other of the spacers (47) as soon as a rim (A) is engaged therebetween, so as to secure them against movement as soon as they are in contact with two diametrically opposite points of the rim, and so as to bring them back towards one another once the rim has passed beyond the front end thereof.

11. The machine as claimed in claim 10, characterized in that the means for actuating the spacers comprise a jack (48) fixed with respect to the cross pieces supporting the stops and whose piston rod (48a) is parallel to the longitudinal axis of the conveyor, as well as two endless chains (69) each passing round three gear wheels (70) integral with the cross pieces, in such a way as to form two triangles symmetrical with respect to the longitudinal axis of the conveyor, each chain having a section (69a) parallel to the piston rod of the jack and connected thereto, and a section (69b) perpendicular to the longitudinal axis of the conveyor and connected to a respective stop (42).

12. The machine as claimed in claim 10, characterized in that the spacers (47) comprise rollers (47a) on their facing faces and in the vicinity of their bases.

13. The machine as claimed in claim 9, characterized in that the stops (42) are movable parallel to the longitudinal axis of the conveyor (1), and in that means are provided for, on the one hand, accompanying the movement of the stops when the rim in contact therewith carries them along in the direction of the conveyor and, on the other hand, moving the stops in the opposite direction as soon as the rim is freed from contact therewith.

14. The machine as claimed in any one of claim 1, characterized in that the tables (9) each comprise a foot (33) extending inwardly of the conveyor (1), and in that the lifting means (16b) comprise a lifting rail (57) parallel to the carrier side of the conveyor and forming a guide path for the lower end of the foot (33) of the tables (9) when these latter advance under the height limiter (16a), as well as means for actuating the rail (57) for raising this latter when a support (8) is completely engaged under the limiter (16a), securing it against movement when the rim (A) which it carries is in contact with this latter and lowering it once the rim is completely freed from contact therewith.

15. The machine as claimed in claim 14, characterized in that the rail forms the large side of a deformable parallelogram (56), and in that the means for actuating the rail comprise a jack (59) whose piston rod is connected to the small side of the parallelogram.

16. The machine as claimed in claim 6, characterized in that the locking means comprise pressure plates (37,38,39) parallel to the connecting links (29) and encompassing these latter in twos, one (37) of the lateral pressure plates being fixed whereas the other pressure plates (38,39) are mobile in a direction transverse to the links (29); at least one shaft (34) passing slidably through the pressure plates and into an oblong opening (30) formed in each connecting link (29); a decompression rail (35) external to the support (8) and on which is fixed the end of the shaft the nearest to the fixed pressure plate (37); and at least one spring washer (40) fitted on to the shaft, between a fixed bearing (36) slidably receiving the other end of the shaft (34) and the face of the mobile lateral pressure plate (37) which is facing the bearing, the shaft (34) further comprising a collar (40a) which is applied against the other face of the mobile lateral pressure plate (37), inside the oblong opening (30) of the adjacent connecting link (29).

17. The machine as claimed in claim 16, characterized in that means (41) are provided between the bearing and the spring washer for adjusting the amount of compression of this latter.

18. The machine as claimed in claim 16, characterized in that means (60) are provided for moving the decompression rail (35) towards the support (8) as soon as a rim (A) is at the level of the entrance of the height limiter (16a) and until this latter has come into contact therewith.

19. The machine as claimed in claim 16, characterized in that the locking means comprise on each side of the median longitudinal axis of the conveyor (1), two parallel shafts (34) connected by the same decompression rail (35).

* * * * *